United States Patent [19]

Hyrsky

[11] Patent Number: 5,705,054
[45] Date of Patent: Jan. 6, 1998

[54] FILTERING SYSTEM

[75] Inventor: Timo Hyrsky, Vantaa, Finland

[73] Assignee: Imatran Voima Oy, Helsinki, Finland

[21] Appl. No.: 694,275

[22] Filed: Aug. 8, 1996

[51] Int. Cl.$^6$ ............... B01D 29/50; B01D 29/60
[52] U.S. Cl. ............... 210/109; 210/340; 376/313
[58] Field of Search ............... 376/313; 210/340, 210/341, 257.2, 109, 172, 201, 202, 321.75, 499

[56] References Cited

U.S. PATENT DOCUMENTS

| | | | |
|---|---|---|---|
| 3,502,212 | 3/1970 | Ueda | 210/108 |
| 4,093,551 | 6/1978 | Paabo et al. | 210/201 |
| 4,456,531 | 6/1984 | Kubota et al. | 210/499 |

*Primary Examiner*—Daniel D. Wasil
*Attorney, Agent, or Firm*—Birch, Stewart, Kolasch & Birch, LLP

[57] ABSTRACT

A system for filtering liquids like cooling water and emergency cooling water in nuclear power stations and other industrial plants wherein a continuous circulation of a coolant or other liquid has to be secured. The system comprises a first filtering surface and a first filtrate space which is at least partially limited by the first filtering surface and at least one further filtering surface with a second filtrate space which is at least partially limited by a filtering surface. A filtrate outlet channel is connected to the first filtrate space and a siphon connects the filtrate spaces.

12 Claims, 3 Drawing Sheets

FILTERING SYSTEM

The present invention relates to a system for filtering cooling water and emergency cooling water in nuclear power stations and other industrial plants wherein a continuous circulation of a coolant or other liquid has to be secured.

BACKGROUND OF THE INVENTION

In nuclear power plants several kinds of cooling and emergency cooling systems are used. The reactor is enclosed in a pressure vessel and primary cooling water is circulated in the reactor for cooling the reactor and transferring the energy from the reactor. From the primary cooling circuit the energy is transferred in heat exchangers to a secondary circuit. The water in secondary circuit is heated and evaporated by the energy of the water of the primary circuit and the steam is used to rotate turbines of electric generators. Usually the primary and secondary circuits consist of several parallel circuits. Multiple parallel circuits are used in order to increase the reliability of the system and because the thermal power of a nuclear reactor is very big, large amounts of water needed for transferring the heat from the reactor are more easily handled with multiple pumps and heat exchangers. In a pressurised water reactor (PWR) the water in the primary circuit is always kept in a liquid state under high pressure. In a boiling water reactor (BWR) the cooling water is evaporated in the pressure vessel of the reactor and the steam is cooled into liquid water in the heat exchangers of the secondary cooling circuit.

In the design of nuclear power reactors, potential accidents have to be taken into account and the supply of cooling water also during accidents has to be secured. One potential type of accident that has to be avoided is a loss of coolant accident (LOCA), which occurs when there for some reason is a break in the cooling water supply. As a result, the reactor core will overheat which may cause severe damage to the surroundings. To avoid overheating, large amounts of coolant must be supplied to the reactor by emergency coolant systems in order to absorb the heat that builds up.

In the event of a loss of coolant accident (LOCA) the emergency core cooling system and containment spray system would be activated to supply coolant to the reactor and vessel to remove the decay heat and to the containment spray system to limit containment overpressure. These systems are expected to operate for extended periods in a recirculating mode drawing water that is accumulated in the containment.

In pressurized water reactors (PWRs), the containment emergency sumps provide for the collection of reactor coolant and spray water. The sump strainers or other types of filter structures are used to screen out debris.

In boiling water reactors (BWRs), the suppression pool serves as the water source for effecting long-term recirculation. As in the case of PWRs, the suction strainers are used to protect the pump inlets.

The recirculated water may contain impurities capable of transport even at small water velocities. A concern with transportable debris is its potential effect on the blockage of filtering systems.

In recent years, there has been several incidents in nuclear power plants related to emergency coolant filtering systems becoming blocked by debris such as insulation materials (e.g. mineral wool) or other materials being washed into the sump or suppression pool. Such situations and technical solutions to avoid these risks have been described in the journal Nuclear Engineering International, Febuary 1996, pp. 12–25.

Filtration constructions of prior art are disclosed in U.S. Pat. No. 4,456,531 which describes various alternatives for securing the filtering operation by altering the active filtering segments of a sieve or a cylindrical strainer. Another filtering system including a siphon system for backwashing a filter bed is described in U.S. Pat. No. 3,502,212.

One feature relating to the reliability of cooling systems is effective removal of solid impurities from the circulating water. This is especially important in emergency cooling systems since if an emergency cooling system has to be used, a lot of debris like insulation materials and rust particles are washed into the circulating water. Also during normal operation of the plant some solid impurities gradually accumulate in the water and the water must be filtered before it enters the pumps. The impurities are collected on the filtering surfaces of the filters and the filters have to be cleaned or replaced at regular intervals when the pressure loss over the filtering surface exceeds a predetermined limit.

In an emergency situation it would be impossible to change the filters. However, in such a situation it is essentially important that the circulation of the cooling water is not interrupted. If an emergency cooling system is used, the most easily moving materials are first collected on the filters and form a filtering layer on the actual filter. This layer is formed of materials having a light weight and relatively large surface area, like insulation material fibers, paint particles and other coating materials. When smaller particles are collected on this filtering layer, the pressure loss over the filter rises rapidly and gradually the filter is blocked. The blocking of the filter can be avoided by cleaning the filter for instance with a backwash system wherein the flow direction of the filter is changed, or with a scraper. The problem with the cleaning systems is that they only remove the material from the surface of the filter to the circulating water wherefrom it is rapidly collected on the filters again. Mechanical scrapers are also difficult to implement, they increase the cost of the filter and need frequent servicing.

One other possibility to secure circulation of the cooling water is the use of two or more parallel filters. In this system the water flows first through one of the filters and when the pressure loss over it rises, a new filter is taken in use. The change of filters is normally done by valves which are operated automatically or manually with a remote control. Using parallel filters provides an important benefit since the easily moving materials, which also are the main reason for blocking of the filters, are collected on the filter that is used first and the second filter can be used substantially longer time without danger of blocking.

The valve system increases the costs of the system, but more important drawback in nuclear power plants is, that the valve system makes the cooling circuit more complicated, which at least theoretically decreases the calculated reliability of the system. The operation of the valve system has to be monitored and serviced properly to secure its operation. Securing the operation of the emergency and backup cooling systems is difficult since they are not supposed to be used at all during the operational life of the plant but they have to function perfectly if needed. For these reasons the emergency cooling system should be as simple and reliable as possible. Also the energy needed to operate the valves have to be transferred to them. This can be very problematic since the filters are located in difficultly accessible places and usually under water.

SUMMARY OF THE INVENTION

According to the present invention the filter system comprises at least two filtering surfaces and at least two limited spaces in each of which the liquid to be filtered can enter through a filter surface and the spaces are connected pairwise through a siphon.

According to the other aspects of the present invention, the system comprises several filtering surfaces and limited spaces and each space is connected to an other space through a siphon and the siphons have different height.

The invention provides a simple and reliable method for changing the filtering surface automatically during the operation of the filter. Debris and other easily moving material contained in the water to be filtered are collected on a first filtering surface while the succeeding filtering surfaces remain clean for a considerably long time. No moving mechanical parts are needed and the operation of the system does not require any outside monitoring or energy. The condition of the apparatus can be easily checked and the operation of the system proved. Excessive corrosion is the only risk that may damage the apparatus so much that it is rendered inoperable. However, if the filters or their housings start to leak, it naturally does not prevent the flow of water. In very difficult conditions the filter may block, but the risk of blocking can be effectively decreased by a cleaning system, for example a scarper or a backwash apparatus.

Other objects and features of the invention will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION OF THE PRESENTLY PREFERRED EMBODIMENTS

Figure 1:
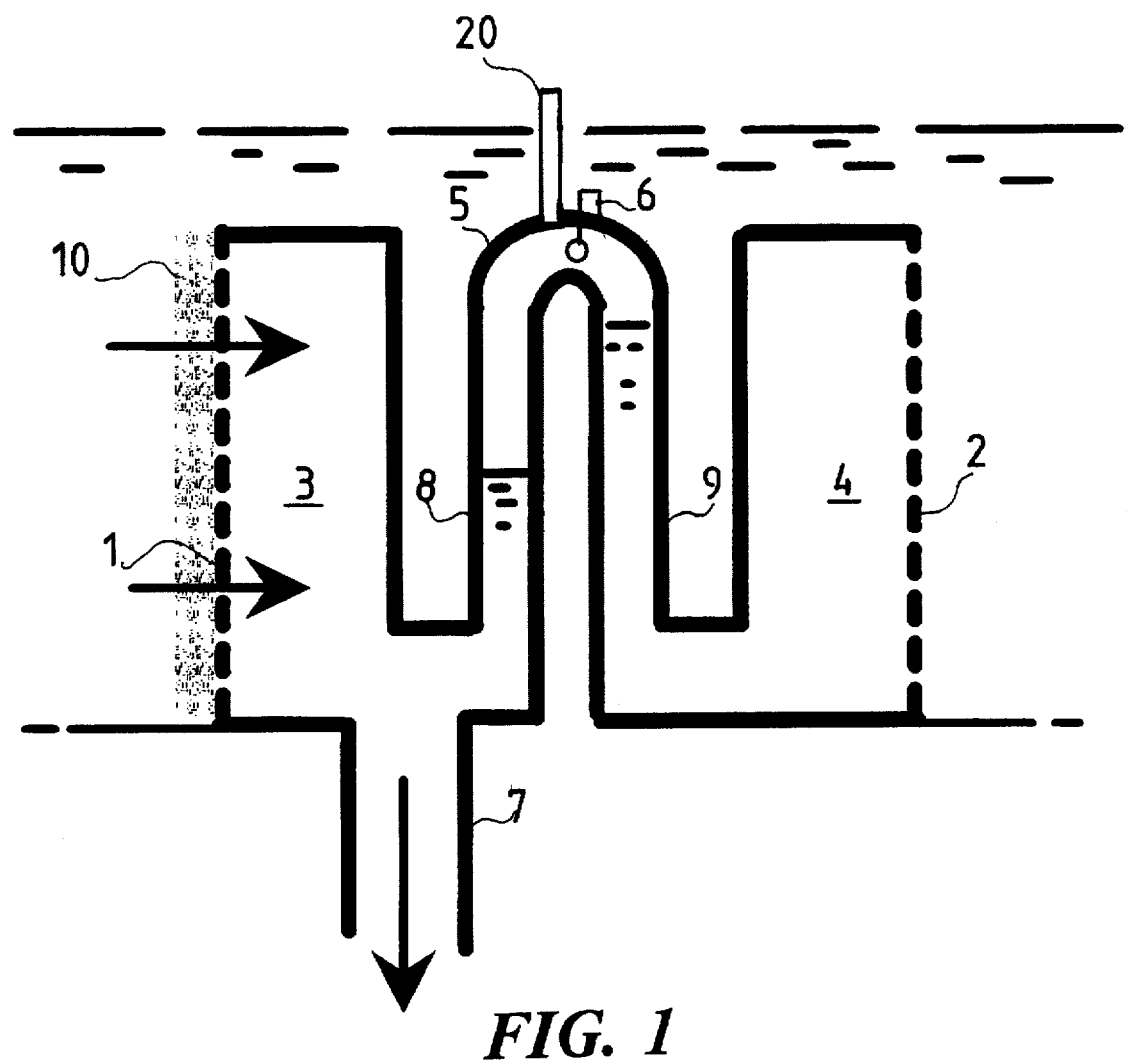
FIG. 1 shows diagrammatically an embodiment of the invention in the first operation stage.
Figure 2:
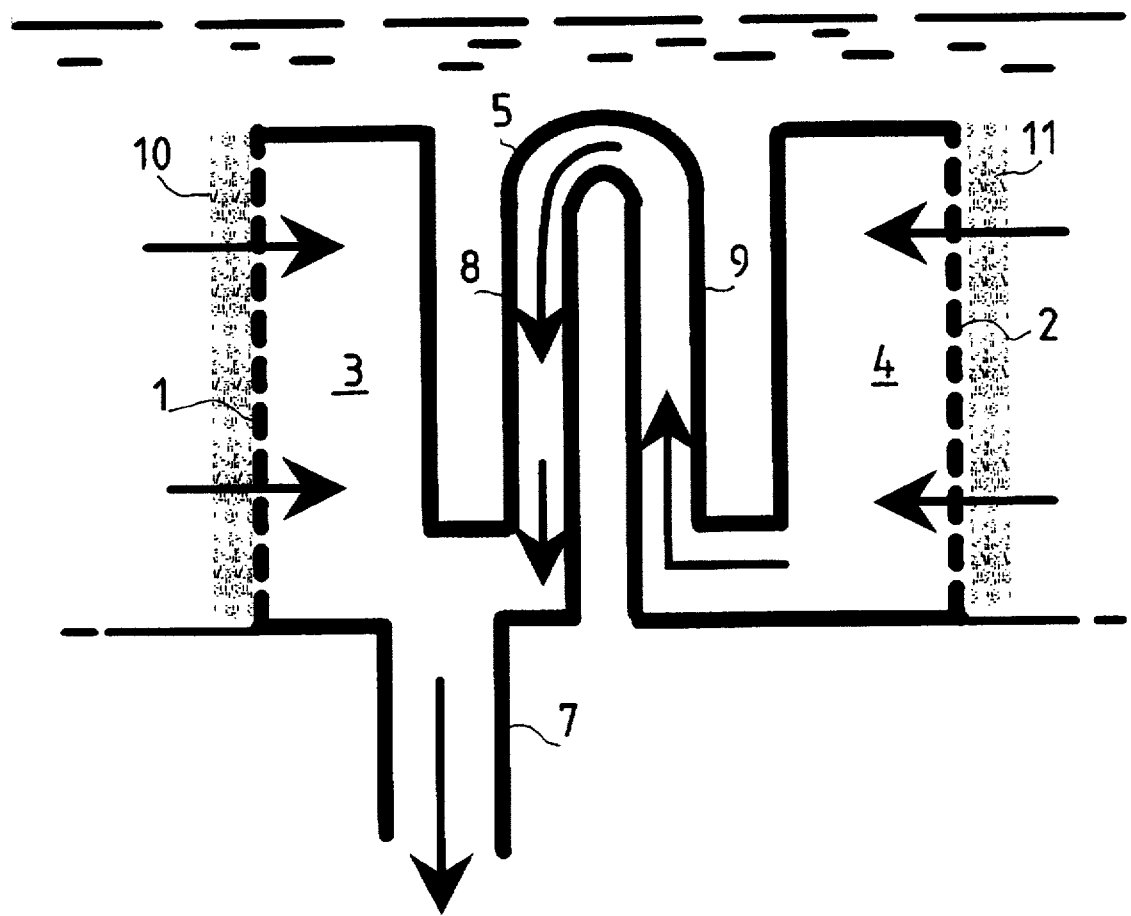
FIG. 2 shows the embodiment of the FIG. 1 in a second operational stage.

The embodiment shown in the FIG. 1 shows a filtering system comprising two filtering surfaces 1, 2 and two spaces 3, 4 for the filtrate. The filtrate spaces 3, 4 are connected with a siphon 5 and in the bottom of the first filtrate space 3 is an outlet channel 7 for filtrated liquid, which in nuclear power plants is usually water. In the highest part of the siphon 5 is a detector 6 for detecting the presence of water in the siphon. The detector may be a simple float or any other suitable instrument.

The system may be immersed in water or installed in a dry pool which is filled when water is to be circulated through the filtering system. When the water level rises or the filtering surfaces are immersed in water, water enters the filtrate spaces 3, 4 and flows into the legs 8, 9 of the siphon 5. The air which is in the siphon is trapped in the bend of the siphon 5 and prevents the flow between filtrate spaces 3, 4. In this situation water is sucked into the filtrate space 3 where the outflow channel 7 is located and further away through the outflow channel. The impurities of the inflowing water are collected on the first filtering surface 1 and build up a filter layer 10 which increases the separation capacity of the filter 1. When the filter layer 10 is formed on the filtering surface 1 it entraps smaller and smaller particles and the pressure difference needed to suck water through the filter layer 10 and filtering surface 1 increases. The pressure drop over the first filtering surface 1 rises and when it is greater than the pressure difference over the siphon 5, water starts to flow through the siphon from leg 9 to leg 8 and the filtration of inflowing water through the second filtering surface 2 starts. At this stage the water at first flows mainly through the second filtering surface, but when a filter layer 11 has been collected on its surface, some water flows again through the first surface also.

By using a simple float 6 arranged in the bend of the siphon 5 the moment when the function of second filtering surface 2 starts can be easily detected. Other means suitable for detecting a presence of liquid in the siphon 5 may also be used, but measurement of the pressure in the filtrate spaces 3, 4 is not applicable for detecting the operation of the second filtering surface 2 since the pressure first rises and then drops rapidly when the water starts to flow through the siphon 5. One other feature that may be added to the system is a gas inblow pipe 20. This pipe 20 may be used for filling the siphon 5 with air or another suitable gas when the operation of the filters is interrupted for example during maintenance or cleaning. Pipe 20 may also be used for automatic cleaning of the filter surfaces by blowing gas through the filtering surfaces in the opposite direction on the water flow so that the filter layers 10, 11 are removed. When the blowing of gas is stopped, the operation of the system continues as described above. The filters can be cleaned also by a backflow from outflow channel 7.

Figure 3:
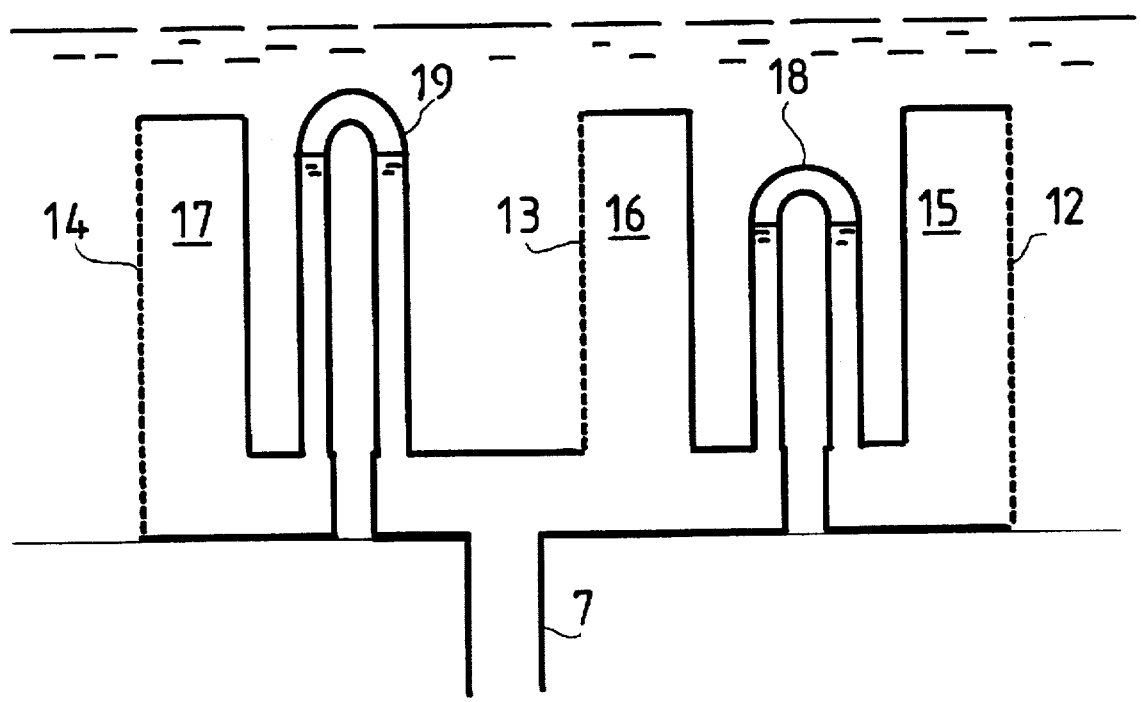
FIG. 3 shows an other embodiment of the invention.

FIG. 3 shows a system wherein three filtering surfaces 12, 13 and 14 are arranged in series. The outflow channel is connected to the central filtration space 16 and when the filtration starts, the water travels through the first filtering surface 13. The second filtration space 15 is connected to the first filtration space 16 through a low siphon 18 and the third filtration space 17 through a high siphon 19. When the pressure drop over the first filtration surface increases 13, water starts to flow through the second filtering surface 12. When the second surface 12 has collected so much debris that the pressure drop through the second surface has become higher than the pressure drop in the siphon 18, the filtration starts through the third filtration surface 14. In this and the above described embodiments the heights of the siphons are chosen in such a way that the first and second filtering surfaces 12, 13 collect most of the impurities so that the third surface 14 functions as long as possible and prevents increased pressure drop through the system.

The coolant to be filtered is normally water but the system is equally suitable for other liquids also. For example, the system may be used in process industry for filtering liquid process chemicals. The gaseous medium in the siphon is preferably air, or it can be nitrogen gas in the case of boiling water reactors wherein an inert atmosphere is used in the reactor. Other gases may also be used. The filtering surfaces may be of different shape and materials and have different permeabilities to the filtered liquid. For example, in emergency cooling systems the filtering surfaces often consist of an aperture plate having a hole diameter of 2–6 mm. The first filtering surface may have larger holes and the later surfaces smaller holes since the danger of blocking is smaller on the later surfaces as the impurities are mainly collected on the previous filters. By using at least two-stage filtration and possibly different kinds of filters, different types of impurities can be collected on the different filters and the risk of blocking the system is much smaller than that of a single larger filter. This is very advantageous since the total filtering area of the system may be smaller than the area of a single filtering surface.

The actual filtering system may have various designs and the form and the construction of the apparatus may be chosen quite liberally. The filtering surfaces should at least partially limit the filtrate spaces, but the walls of the spaces may also be wholly made of suitable filtering material. The number of filtering surfaces arranged parallelly and in series is not limited and in a typical nuclear power plant may be over hundred parallel filters. The filter surfaces may be provided with scrapers or other cleaning apparatuses and also backflow of the coolant may be used for cleaning the filtering surfaces. If backflow is used, the siphons have to be equipped with gas inflow pipes since the backflow pushes the siphons full of liquid.

Thus, while there have been shown and described and pointed out fundamental novel features of the invention as applied to a preferred embodiment thereof, it will be understood that various omissions and substitutions and changes in the form and details of the system may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

What is claimed is:

1. A filtering system for filtering liquids in plants where a continuous flow of liquid through the filtering system has to be secured, the system comprising:

a first filtering surface, a first filtrate space which is at least partially limited by the first filtering surface, at least one further filtering surface, at least one further filtrate space which is at least partially limited by a filtering surface, a filtrate outlet channel connected to the first filtrate space, and at least one siphon connecting two of the filtrate spaces, the number of siphons being sufficient to connect the spaces pairwise so that each space is connected to at least an other space through a siphon.

2. A system according to claim 1, comprising two filtering surfaces, two filtrate spaces and one siphon.

3. A system according to claim 1, comprising three filtering surfaces, three filtrate spaces and two siphons.

4. A system according to claim 1, comprising detector means for detecting the height of the liquid in a siphon.

5. A system according to claim 1, wherein each filtering surface has different permeability to the filtered liquid.

6. A system according to claim 1, comprising a gas inblow pipe connected to each siphon for blowing gas into the siphon.

7. A system according to claim 1, comprising at least two siphons having different heights.

8. A filtering system for filtering liquids in plants where a continuous flow of liquid through the filtering system has to be secured, the system comprising:

a first filtering surface, a first filtrate space which is at least partially limited by the first filtering surface, a second filtering surfaces having different permeability to the filtered liquid than the first surface, second filtrate space which is at least partially limited by the second filtering surface, a filtrate outlet channel connected to the first filtrate space, and a siphon connecting the filtrate spaces.

9. A filtering system for filtering liquids in plants where a continuous flow of liquid through the filtering system has to be secured, the system comprising:

a first filtering surface, a first filtrate space which is at least partially limited by the first filtering surface, at least two further filtering surfaces having different permeability to the filtered liquid, at least two further filtrate spaces which are at least partially limited by a filtering surface, a filtrate outlet channel connected to the first filtrate space, and two siphons connecting the spaces pairwise so that each space is connected to at least an other space through a siphon.

10. A system according to claim 8, comprising a gas inblow pipe connected to each siphon.

11. A system wherein several filtering systems described in claim 1 are connected parallel to each other.

12. A system according to claim 9, comprising a gas inblow pipe connected to each siphon.

* * * * *